Dec. 1, 1959 S. C. ROCKAFELLOW ET AL 2,915,635

HIGH FREQUENCY PULSE GENERATOR

Filed Jan. 6, 1958 2 Sheets-Sheet 1

INVENTORS
STUART C. ROCKAFELLOW
THEODORE R. THOMSEN
BY
Woodhams Blanchard and Flynn
ATTORNEYS INVENTORS
STUART C. ROCKAFELLOW
THEODORE R. THOMSEN
BY
Woodhams Blanchard and Flynn
ATTORNEYS

United States Patent Office 2,915,635

Patented Dec. 1, 1959

2,915,635

HIGH FREQUENCY PULSE GENERATOR

Stuart C. Rockafellow, Plymouth, and Theodore R. Thomsen, Farmington, Mich., assignors to Robotron Corporation, Detroit, Mich., a corporation of Michigan Application January 6, 1958, Serial No. 707,413

7 Claims. (Cl. 250—27)

This invention relates to a high frequency pulse generator and, more particularly, relates to equipment for producing pulses at ultra-sonic frequencies, which equipment is less expensive than known pulse generators both in its original cost and in its operating cost.

Pulse generators intended for producing pulses at high frequencies, particularly ultra-sonic frequencies, have in the past been based on many different operating principles and have been produced in a very large number of types. However, insofar as I am aware, all known devices of this type which enjoy commercial acceptance because of their operating capabilities, are relatively expensive either to produce or to operate. Thus, because of such cost, the potentialities of high frequency pulses for many uses, such as for ultra-sonic laundering, metal cleaning, or metal cutting have not been fully exploited.

More particularly, the use of vacuum tubes in the design of high frequency pulse generators is not entirely desirable in view of the low overall efficiency of such generators. This efficiency is usually about 50 percent due to the inherent losses in the vacuum tubes by space charge effects and due also to the losses in the resonant circuits utilized at the frequencies involved.

In considering pulse generating circuits utilizing gas tubes, it has been previously believed that the relatively slow de-ionization time of gas tubes prevents their use for high frequency pulse generation. For example, the shortest de-ionization time available in a mercury-type thyratron is about 100 micro-seconds and, hence, the fastest repetitive rate that can be obtained with saftey to the thyratron and equipment associated therewith is about 8,000 to 9,000 firings of the tube per second. These frequencies are a long way from the 40,000 to 50,000 cycles per second required for the uses mentioned above and other uses being developed for high frequency pulses.

However, gas-filled tubes have high peak current ratings and further they have a high average current rating for rather small, hence inexpensive, sizes of tubes. Still further, gas-filled tubes have very high efficiencies which, for the uses here involved, often run as high as 99 percent.

Therefore, it is evident that if a high frequency pulse generating circuit could be devised utilizing gas-filled tubes and yet developing frequencies of up to 40,000 to 50,000 or higher cycles per second, such a circuit would be of great value in further promoting the commercial application of high frequency pulses for the uses above mentioned as well as others.

The present invention contemplates simple and inexpensive circuit utilizing gas-filled tubes by which pulses of high frequencies may be accurately produced. Further, the circuit requires no mechanically moving parts or other fluid, and hence its maintenance cost is extremely low.

Therefore, a principal object of the invention is to provide a circuit for providing a high frequency pulse, which circuit can be produced at a relatively low cost as compared to previously known circuits intended for the same purposes.

A further object of the invention is to provide a circuit as aforesaid, which will be of such simplicity that it will operate accurately and satisfactorily over a long period of time with a minimum of maintenance.

A further object of the invention has been to provide a circuit, as aforesaid, which may be readily modified to produce pulses of whatever frequencies are desired for given applications.

A further object of the invention has been to provide a circuit, as aforesaid, having a high degree of stability in the frequency of the pulses produced.

A further object of the invention is to provide a circuit, as aforesaid, utilizing only gas-filled tubes and requiring no vacuum tubes.

A further object of the invention is to provide a circuit, as aforesaid, capable of generating frequencies of the order of 40,000 to 50,000 cycles per second and which may be readily modified, if desired, to produce cycles at any given high frequency.

Other objects and purposes of the invention will be apparent to persons acquainted with circuits of this general type upon reading the following description and inspecting the accompanying drawings.

*General description*

Figure 1:
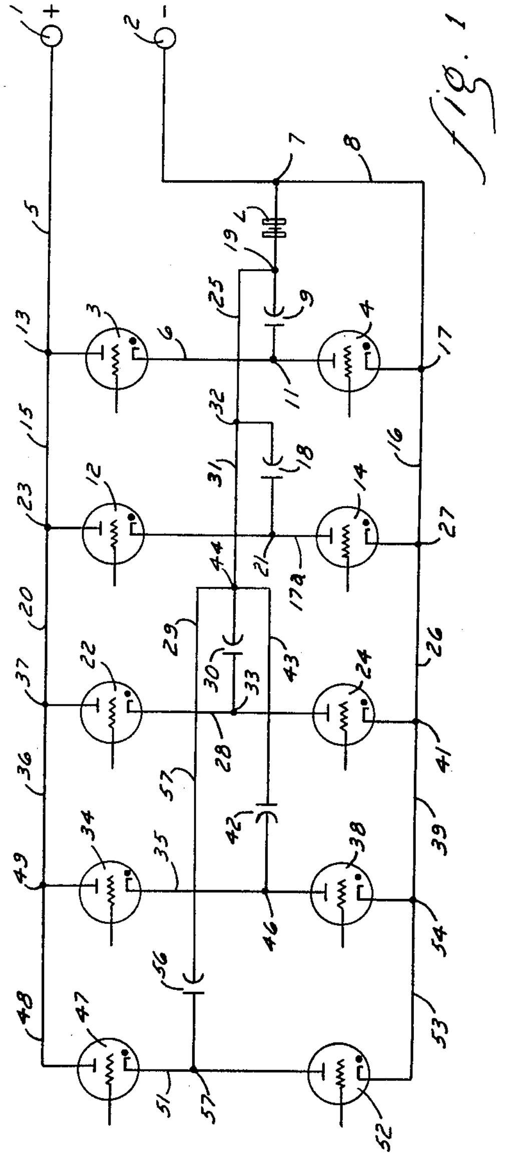
Figure 1 is a diagram of a circuit embodying one illustrative form of the invention.

In carrying out the invention, we have provided a circuit having a pair of gas-filled tubes serially connected in anode-to-cathode relationship with each other and connected to a suitable source of constant potential. A capacitor is connected at one of its sides to a point intermediate said tubes and is connected at its other side to a further junction point. The load is connected between said last named junction point and the negative side of said source. In Figure 1 the load is indicated as being a crystal-type transducer which may be immersed in a fluid in which it is desired to create high frequency waves.

Additional pairs of anode-to-cathode serially connected gas-filled tubes are connected in parallel with said first named pair of gas-filled tubes. Each of said pairs of tubes has a capacitor connected at one side thereof to a point between said pair of tubes and connected at its other side to said junction point between said load and said first named capacitor.

Means are provided for firing the tubes of each of said pairs of tubes at timed intervals sufficiently separated from each other that the impulses applied to said load by all of the pairs of tubes are applied at a very high frequency but the respective tubes of each pair are themselves fired only at a sufficiently low frequency that there is a time interval between successive periods of conductivity for any one tube which is greater than the deionization time of said one tube.

*Detailed description*

Referring now to the drawings in more detail, a pair of terminals 1 and 2 are connected to any suitable source of constant potential. The positive terminal 1 of said source is connected by the conductor 5 to the anode of a gas-filled tube as a thyratron 3 and the negative side of said source is connected by a conductor 8 to the cathode of a second gas-filled tube 4. A conductor 6 connects the cathode of the first tube 3 with the anode of the second tube 4. A point 7 in the conductor 8 is connected to the load L, which in this case is crystal-type transducer, and thence through a capacitor 9 to a point 11 located in the conductor 6. The first and second tubes 3 and 4 will sometimes hereinafter be referred to as the first pair of tubes.

A third gas-filled tube 12 has its anode connected by a conductor 15 to a point 13 located in the conductor 5. A fourth gas-filled tube 14 has its cathode connected by the conductor 16 to a point 17 in the conductor 8. A conductor 17*a* connects the cathode of the third tube 12 with the anode of the fourth tube 14. A capacitor 18 is connected through a junction point 32 and conductor 25 to a point 19 located between the load L and the capacitor 9 and is also connected to a point 21 located in the conductor 17. The third and fourth tubes 12 and 14 will sometimes hereinafter be referred to as the second pair of tubes.

A fifth gas-filled tube 22 has its anode connected by a conductor 20 to a point 23 located in the conductor 15. A sixth gas-filled tube 24 has its cathode connected by a conductor 26 to a point 27 in the conductor 16. A conductor 28 connects the cathode of the fifth tube 22 to the anode of the sixth tube 24. A capacitor 30 is connected by a conductor 31 to a point 32 in the conductor 25 and is also connected to a point 33 in the conductor 28. The fifth and sixth gas-filled tubes 22 and 24 will sometimes hereinafter be referred to as the third pair of tubes.

The seventh gas-filled tube 34 has its anode connected by the conductor 36 to a point 37 in the conductor 20 and its cathode connected by a conductor 35 to the anode of an eighth gas-filled tube 38. The cathode of said tube 38 is connected by a conductor 39 to the point 41 in the conductor 26. A capacitor 42 is connected by the conductor 43 to a point 44 on the conductor 31 and is also connected to a point 46 on the conductor 35. The seventh and eighth tubes 34 and 38 will sometimes hereinafter be referred to as a fourth pair of tubes.

A ninth gas-filled tube 47 has its anode connected by the conductor 48 to a point 49 in the conductor 36 and its cathode connected by a conductor 51 to the anode of a tenth gas-filled tube 52. The cathode of the said tube 52 is connected by a conductor 53 to a point 54 in the conductor 39. A capacitor 56 is connected by a conductor 57 to said point 44 in the conductor 31 and is also connected to a point 57 in the conductor 51. The ninth and tenth tubes 47 and 52 will sometimes hereinafter be referred to as the fifth pair of tubes.

The grids of the respective tubes may be connected to any suitable biasing means for holding said tubes normally non-conductive which biasing means will be overcome by a positive pulse to permit firing thereof. Thus, the grids of said tubes are connected to a suitable sequential firing means which may be any of many known types, preferably electrical. By way of example, Figure 3 indicates schematically a well-known type of counting tube 60 capable of producing small positive output pulses at high frequencies from successive cathodes. A suitable type of tube is a cold cathode bidirectional counter tube such as that marketed by Sylvania Electric Products, Inc., Woburn, Massachusetts, under the designation Sylvania 6476 or that marketed by Baird-Atomic, Inc., 33 University Road, Cambridge, Massachusetts, under the designation of "Glow Transfer Tube," type GS 10C or type GS 12D. As is well known, this type of tube operates by moving a glow discharge from one output cathode to an adjacent one by means of a relatively small negative voltage pulse. Thus, the discharge can be made to move in succession along the output cathode series by a successive application of voltage pulses. When the glow moves to an output cathode, such cathode moves positive and makes available a positive pulse. The negative voltage pulses for shifting the glow are applied to guide cathodes located intermediate the output cathodes and this, in well known manner, causes the glow to shift. Since the construction and operation of this type of tube are well understood and since the details of such tube are not essential to an understanding of the invention, the guide cathodes and other details of the tube are omitted from the drawing for purposes of clarity. The negative pulses for the guide cathodes can be supplied from any suitable source such as an oscillator circuit, and the frequency of such pulses will control the rate at which the gas-filled tubes are fired.

Figure 3:
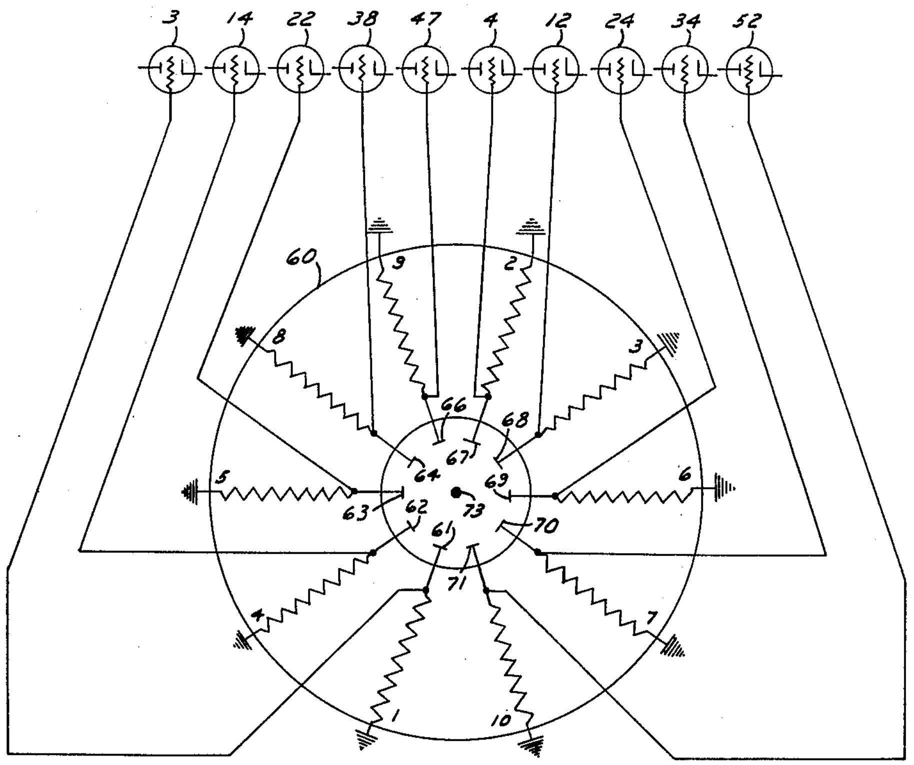
Figure 3 illustrates the use of a decatron tube controlling the firing of the several thyratrons.

The output pulses from successive cathodes of the counting tube 60 are in this embodiment fed to the grids of the respective gas-filled tubes. Thus, as indicated in Figure 3, the output of the cathode 61 of said counting tube is fed to the grid of the first tube 3, the output of the second cathode 62 is fed to the grid of the fourth tube 14, the output of the third cathode 63 is fed to the grid of the fifth tube 22 and the output of the fourth cathode 64 is fed to the grid of the eighth tube 38 and the output of the fifth cathode 66 is fed to the grid of the ninth tube 47. Similarly, the output of the sixth cathode 67 is fed to the grid of the second tube 4 and the outputs of the successive cathodes 68, 69, 70 and 71 are fed, respectively, to the grids of the third, sixth, seventh and tenth tubes 12, 24, 34 and 52, respectively.

Thus, as the glow discharge moves from one cathode to the next in the usual manner, successive positive output pulses will be applied to the grids of the several tubes in the order corresponding to their connections to the counting tube cathodes.

*Operation*

With the circuit as described and illustrated connected to a convenient and conventional source of D.C. potential, such as a battery, a positive potential is applied to the anodes of each of the first, third, fifth, seventh and ninth tubes, 3, 12, 22, 34 and 47, respectively. The first tube 3 is the first one rendered conductive in a given cycle of operation, as indicated in Figure 3. When this is rendered conductive, current will flow through tube 3 and momentarily through capacitor 9 to the negative side of the source. This constitutes one pulse of output applied to the load 7 and simultaneously changes capacitor 9.

Ignoring for the moment the functioning of the second, third, fourth and fifth pairs of tubes, attention will be directed toward the balance of the cycle utilizing only the first pair of tubes 3 and 4.

As soon as the capacitor 9 is substantially charged, the potential on the opposite sides of the tube 3 will be substantially equalized and flow therethrough will cease. Tube 3 will then de-ionize. Thereafter, the grid of the second tube 4 will be energized thus permitting flow from one side of the capacitor 9 through said tube 4 through conductor 8 to the junction point 7 and thence back through the load to the other side of the capacitor 9. This provides a second pulse through the load. Flow ceases as soon as the capacitor 9 is substantially discharged.

It will be recognized that the foregoing reference to the initiation and termination of flow of electrical current through the tube as being dependent on the charged and discharged condition of the capacitor 9 is an approximation in that initiation or termination of such flow will be determined by the condition of charge on the capacitor, which condition need not necessarily be a condition of full charge or full discharge. However, since the starting and stopping of such flow of current through the load is generally associated with the charging and discharging of the capacitor 9, and other capacitors in corresponding positions as mentioned hereinafter, reference has been made above and will be continued to be made thereto in terms of the charging and discharging as a matter of convenience and will be so understood.

Turning now to the functioning of the second pair of tubes, namely, tubes 12 and 14, it will be recognized that an action generally similar to that just described with respect to tubes 3 and 4 will take place. With a constant potential applied to the anode of the third tube 12, when the grid of said tube 12 is rendered sufficiently positive to initiate flow of current through said tube, capacitor 18 will become charged by a pulse flowing from the cathode of tube 12 to the point 21, thence through the capacitor 18, point 32 and through the conductor 25 to the point 19 and thence through the load L to the negative terminal of the source. Such pulse provides a third pulse to the load, which pulse will terminate substantially when the capacitor 18 becomes charged. Tube 12 will then de-ionize. Thereupon, the grid of the fourth tube 14 will be energized in a positive direction and current flow will take place from said capacitor 18 through the fourth tube 14 to the point 27, thence through the conductors 16 and 8 through the load L to the point 19 and thence back through the conductor 25 and the point 32 to the capacitor 18. This substantially discharges the capacitor and provides a fourth pulse through the load.

Similar action may be traced for the third pair of tubes 22 and 24 and the capacitor 30, for the fourth pair of tubes 34 and 38 and the capacitor 42 and for the fifth pair of tubes 47 and 52 and the capacitor 56, each pair of tubes providing additional pairs of pulses to the load in a given cycle.

However, the timing of the intervals at which, and the order in which, said tubes are rendered conductive is such that pulses are applied to the load at a much higher frequency by the system of tubes here shown than would be possible by any one pair of tubes acting alone.

Specifically, referring illustratively to the firing order shown in Figure 3, the first tube 3 is rendered conductive and this provides a first pulse of one polarity to the load in the manner above described. Next the fourth tube 14 is rendered conductive and this supplies a second pulse of the opposite polarity to the load. Subsequently tubes 22, 38 and 47 are caused to fire and each of these provides pulses through said load. By the time that the ninth tube 47 is rendered conductive, the first tube 3 has long since ceased to conduct and has had ample time to become de-ionized.

Next, the second tube 4 is caused to conduct and with the tube 3 now entirely de-ionized, the pulse originating in the charged capacitor 9 will pass through the second tube 4 and through the load back to the capacitor in a manner above described with no danger of the source being short-circuited through the first tube 3. This is followed by energizing of the third tube 12. As was the case with respect to the first pair of tubes 3 and 4, by the time the third tube 12 is energized for discharging the capacitor 18, ample time has elapsed to permit complete de-ionization of the fourth tube 14 so that there is no danger of short-circuiting the source through the tube 14 upon the tube 12 becoming conductive. Similarly, as the tubes 24, 34, and 52, respectively, become conductive, ample time has elapsed to permit the de-ionization of the tubes 22, 38 and 47, respectively, and hence the circuit is protected against short-circuiting and yet pulses are applied to the load at an extremely high frequency.

Thus, if each tube of the five sets of tubes utilized in the embodiment shown here for illustrative purposes, has a de-ionization time of 100 micro-seconds, ample de-ionization time for any given tube will be provided if the pulse from the tube paired therewith is spaced about 120 micro-seconds from the pulse from said given tube. This will provide approximately 8,000 pulses per second from each pair of tubes and with the five pairs of tubes shown, the circuit will produce a total of 40,000 pulses per second through the load.

In further illustration of a circuit of the type described, in one specific embodiment of the circuit shown in Figure 1, the tubes utilized each had a de-ionization time of 100 micro-seconds, a peak rating of 100 amperes, an average current rating of 6 amperes and inverse and forward voltage ratings of 1,800 volts. The circuit was connected to a 1,500 volt supply and it was designed to produce 40,000 pulses per second at the load.

With these conditions to be met, it was apparent that the pulse width should be limited to one-half cycle which meant that each pulse would flow for not over 12½ micro-seconds. With a peak rating of 100 amperes through the tubes, the load would have to have, and accordingly was provided, with a minimum of 15 ohms impedance at the desired pulse rate. Since experimentation has shown that the formula $T=4$ RC provides a usable, though empirical, relationship, the proper substitutions were made in such formula and the formula was solved for C. This provided a value C .2 mfd. for the capacitor for a pulse width not over approximately 12 micro-seconds.

Now turning to the power output available from a single pulse from the circuit above described, the following formula is applicable:

$$WS=\tfrac{1}{2}CV^2$$

Wherein $W$=watts
$S$=seconds
$C$=capacity in farads
$V$=voltage

Using the numerical values mentioned above in the formula just given, we find that each pulse has slightly over 0.2 watt seconds of energy and at a rate of 40,000 pulses per second. Thus, it is apparent that the circuit operating under the conditions described above is capable of generating approximately 8,000 watts per second. This is far greater energy output in view of the relatively small cost of the components needed to provide the circuit described than any other pulse generator known to us which is capable of producing the high frequencies here being utilized.

Figure 2:
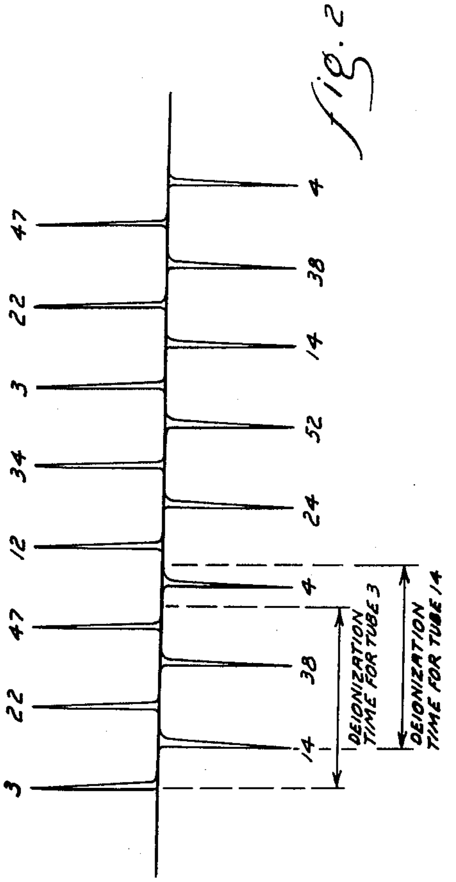
Figure 2 is a diagram illustrating the firing pulses produced by the circuit of Figure 1.

Figure 2 illustrates the pulses which are obtained through the load of Figure 1 from the circuit described and also indicates the necessary de-ionization time of the tubes as compared to the width and frequencies of the respective pulses. This clearly illustrates that between the time of firing of the first tube, as tube 3, and that of the second tube, as tube 4, of any given pair thereof, there is ample de-ionization time provided so that neither of any given pair will be conductive until the other is rendered non-conductive.

*Modifications*

While the foregoing described system utilized five pairs of tubes, it will be recognized that greater or lesser numbers of tubes may be used within the scope of the invention to obtain greater or lesser frequencies. Actually, the upper limit to the number of pulses obtainable by a circuit of the type here shown is determined by the minimum time during which a pulse can be caused to flow and this will be determined primarily by relationship between the voltage of the source and the size of the capacitor.

Figure 4:
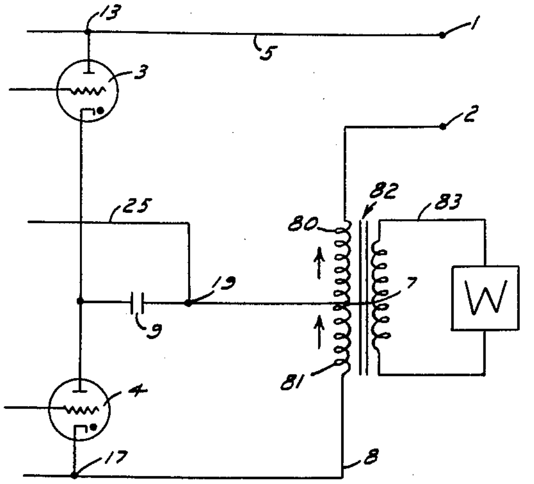
Figure 4 illustrates a modification of the invention.

The circuit illustrated in Figure 1 transmits succesive pulses of opposite polarity to the load. Where it is desired to transmit successive impulses of the same polarity to the load it can be done by utilizing a circuit as shown in Figure 4. Here there is shown only a fragment of the circuit shown in Figure 1 and parts which are identical in Figure 4 with those shown in Figure 1 are indicated by corresponding numerals. Here the load which here constitutes a portion of the primary winding of a suitable transformer 82 is removed from the position shown in Figure 1 and is moved to a position between the point 7 and the negative terminal 2. The remainder of said primary winding is located between the conductor 8 and said point 7. Since pulses pass in the same direction in both portions of said primary winding, as illustrated by the small arrows drawn alongside of each portion of said primary winding, the pulses induced in the secondary winding 83 of said transformer 82 will all be in the same direction and hence pulses fed to the work W will be in the same direction and at such frequency and voltage as is provided by the parameters of the circuit.

The work W in Figure 4 and the load L in Figure 1, may, of course, be an air gap where the device is to be used for an arc generator; it may be a crystal type transducer when it is desired to use the system for generating physical waves in a suitable fluid medium; or it may be any other load desired according to the particular purpose to be served by the particular apparatus.

It also will be recognized that any of many conventional types of timing devices can be used for successfully energizing the grids of the several gas tubes in addition to the electronic apparatus shown in Figure 3. For example, a mechanical timer can be utilized if desired, although this would be less desirable in view of the relatively low maximum output which could be obtained.

We claim:

1. A high frequency pulse generator, comprising in combination: a load; a source of constant potential; a first pair of grid-controlled, gas-filled valves each having an anode and a cathode; a first conductor connecting the anode of said first valve to the positive side of said source, a second conductor connecting the cathode of said first valve to the anode of said second valve and a further conductor connecting the cathode of said second valve to the negative side of said source; means also connecting one side of said load to the negative side of said source and to the cathode of said second valve; a first capacitor connected in series between said second conductor and the other side of said load; a second pair of grid-controlled, gas-filled valves and a second capacitor, means connecting said second pair of valves and said second capacitor to each other and to said source in a manner similar to the connections to each other and to said source of said first pair of valves and said first capacitor, the connection of said second capacitor to the other side of said load being at a point between said first capacitor and said load; and a triggering device for successively rendering conductive selected ones of said valves; whereby said load is supplied with pulses at a rate which is substantially the product of the frequency of conductivity of any one of said valves times the number of such valves present in said circuit.

2. A high frequency pulse generator, comprising in combination: a load; a source of constant potential; a first pair of grid-controlled, gas-filled valves each having an anode and a cathode; a first conductor connecting the anode of said first valve to the positive side of said source, a second conductor connecting the cathode of said first valve to the anode of said second valve and a further conductor connecting the cathode of said second valve to the negative side of said source; means also connecting one side of said load to the negative side of said source and to the cathode of said second valve; a first capacitor connected in series between said second conductor and the other side of said load; a second pair of grid-controlled gas-filled valves and a second capacitor, means connecting said second pair of valves and said second capacitor to each other and to said source in a manner similar to the connections to each other and to said source of said first pair of valves and said first capacitor, the connection of said second capacitor to the other side of said load being at a point between said first capacitor and said load; and a triggering device for supplying pulses to the grids of said valves for rendering said valves conductive; whereby said load is supplied with pulses at a rate which is substantially the product of the frequency of conductivity of any one of said valves times the number of such valves present in said circuit.

3. The device defined in claim 1 where the load consists of a transformer whose primary winding is connected at one end thereof to the negative side of said source and is connected at the other end thereof to the cathode of said second valve, the first and second capacitors being connected to a center tap on said primary winding; the secondary winding of said transformer defining the output terminals of the said circuit.

4. A high frequency pulse generator, comprising in combination: a load; a source of constant potential; a plurality of pairs of grid-controlled, gas-filled valves, each valve having an anode and a cathode; a capacitor associated with each pair of valves; each pair of valves being similarly connected to said source, said load and the capacitor associated therewith, the connections for each pair of valves including a first conductor connecting the anode of one valve to the positive side of said source, a second conductor connecting the cathode of said one valve to the anode of the other valve and a third conductor connecting the cathode of the other valve to the negative side of said source; means connecting one side of said load to the negative side of said source and to the cathode of said other valve; means connecting the capacitor for each pair of valves between a point on said second conductor and the other side of said load; triggering means for successively rendering said valves conductive in sequence so that the load is supplied with pulses at a rate equal to the product of the frequency of conductivity of any one of said valves times the number of valves present in the circuit.

5. A high frequency pulse generator, comprising in combination; a load, a source of constant potential; a plurality of pairs of grid-controlled, gas-filled valves; each pair of valves being connected in back-to-back relationship with the anode of one valve thereof being connected to the positive side of said source and the cathode of the other valve thereof being connected to the negative side of said source, the respective pairs of valves being connected in parallel with each other to said source; a capacitor associated with each pair of valves and connected in series between a point between the valves and one side of the load; means connecting the other side of said load to the negative side of said source and to the cathodes of the said other valves of said pairs of valves; triggering means for successively supplying pulses to the grids of said valves so that said valves are successively rendered conductive whereby the load is supplied with pulses at a rate equal to the product of the frequency of conductivity of any one of said valves times the number of valves present in the circuit.

6. A high frequency pulse generator; comprising in combination: a source of constant potential; a load, one side of said load being connected to one side of said source; a plurality of valve circuits connected in parallel to said source, each valve circuit including a pair of normally non-conductive valve means; a capacitor associated with each valve circuit, one side of said capacitor being connected to the anode of one and the cathode of the other of said valve means and the other side of said capacitor being connected to the load so that said valve means, when conductive, transmit a positive and a negative pulse, respectively, through said capacitor to said load; triggering means for successively rendering said valve means of said valve circuits conductive one at a time in sequence so that positive and negative pulses are alternately fed through said load, the load being supplied with pulses at a rate which is substantially the product of the frequency of conductivity of any one of the valve means times the total number of valve means in said valve circuits.

7. A pulse generator according to claim 6 wherein said valve circuits each include a pair of back-to-back connected gas-filled valves and the capacitor associated with each valve circuit is connected to a point between the valves thereof.

References Cited in the file of this patent

UNITED STATES PATENTS

| | | |
|---|---|---|
| 2,394,535 | Dawson | Feb. 11, 1943 |
| 2,508,538 | Posthumus | Nov. 22, 1946 |
| 2,510,989 | Lichtman et al. | June 22, 1949 |
| 2,658,142 | St. John | July 9, 1951 |